(12) United States Patent
Maurer (10) Patent No.: US 7,483,418 B2
(45) Date of Patent: Jan. 27, 2009

(54) DATA AND VOICE TRANSMISSION WITHIN THE SAME MOBILE PHONE CALL

(75) Inventor: Michael Maurer, Waiblingen (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 1025 days.

(21) Appl. No.: 10/845,886

(22) Filed: May 14, 2004

(65) Prior Publication Data

US 2005/0250534 A1 Nov. 10, 2005

(30) Foreign Application Priority Data

May 10, 2004 (EP) .................................. 04368037

(51) Int. Cl.
*H04L 12/66* (2006.01)
(52) U.S. Cl. .................... 370/354; 370/493; 379/93.09; 455/556.1
(58) Field of Classification Search ................. 455/403, 455/414.1, 422.1, 450, 556.1; 370/352, 354, 370/493; 379/93.09
See application file for complete search history.

(56) References Cited

U.S. PATENT DOCUMENTS

| | | | |
|---|---|---|---|
| 5,740,531 A * | 4/1998 | Okada .......................... 455/403 |
| 6,044,266 A * | 3/2000 | Kato ........................ 455/422.1 |
| 6,112,084 A | 8/2000 | Sicher et al. ................. 455/426 |
| 6,185,196 B1 | 2/2001 | Mademann .................. 370/327 |
| 6,278,884 B1 * | 8/2001 | Kim ......................... 455/556.1 |
| 6,282,182 B1 | 8/2001 | Pecen et al. .................. 370/336 |
| 6,532,372 B1 | 3/2003 | Hwang ........................ 455/559 |
| 7,010,291 B2 * | 3/2006 | Iwanaga .................. 455/414.1 |
| 7,016,707 B2 * | 3/2006 | Fujisawa et al. ............. 455/567 |
| 2005/0124348 A1 * | 6/2005 | Gaal et al. ................... 455/450 |

FOREIGN PATENT DOCUMENTS

WO  WO 96/09708  3/1996

* cited by examiner

*Primary Examiner*—Gerald Gauthier
(74) *Attorney, Agent, or Firm*—Saile Ackerman LLC; Stephen B. Ackerman (57) ABSTRACT

A method is described by which digital data can be sent between mobile phones concurrent with speech during a same phone call. The digital data can be from a digital camera that is integrated with the mobile, or cellular, phone. The discontinuous transmission system of the mobile phone system is modified to include a transmission handler that is used to control the packetizing of the digital data to be transmitted within the voids in the transmitted speech determined by a voice activated detector. A reception handler is added to the discontinuous transmission system to allow the extraction of the digital data from the transmitted mobile phone system signal.

34 Claims, 5 Drawing Sheets

DATA AND VOICE TRANSMISSION WITHIN THE SAME MOBILE PHONE CALL

BACKGROUND OF THE INVENTION

1. Field of Invention

The present invention relates to cellular phones and in particular to the transmission of data and pictures simultaneous to voice.

2. Description of Related Art

With the recent popularity of taking pictures with cellular phones (mobile phones) comes the need to efficiently transmit picture while talking on the cellular phone. Presently Multi-Media Services (MMS) use a General Packet Radio Service (GPRS) to transmit non-voice data. Independent of what mobile phone service is used, the GPRS does not allow the transmission of data simultaneous to voice. When a mobile phone user wants to transfer pictures or other data files while talking to another user, two phone calls are necessary, one for the voice conversation and a second for transmitting data. The second of the two calls will be an additional charge. The two calls are required even if the same GPRS system is used to transmit both voice and the data.

In U.S. Pat. No. 6,112,084 (Sicher, et al.) a method and system are directed to doing a simultaneous transfer of data and voice during a call between a mobile station having a Digital Simultaneous Voice and Data (DSVD) modem and a radio telecommunications network having a mobile switching center. U.S. Pat. No. 6,185,196 (Mademann) is directed to a method for transmitting data packets in a cellular mobile radio network to provide for voice and data transmission in which one traffic channel (TCH) is reserved for the data. In U.S. Pat. No. 6,532,372 (Hwang) a method and apparatus are directed to providing data communication between an external electronic device such as a personal computer and a communication device such as a mobile phone.

Figure 1A:
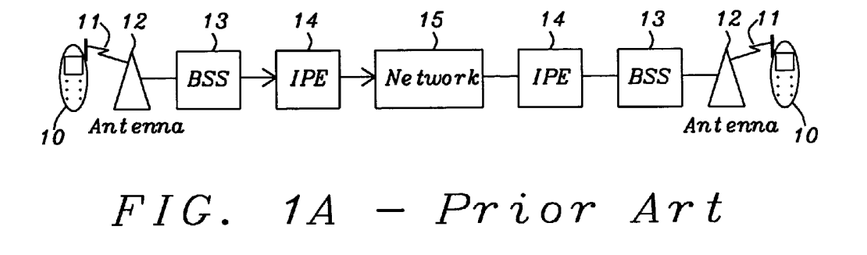
FIGS. 1A and B are block diagrams of prior art for a mobile phone system.

In FIG. 1A is shown a block diagram of prior art of the communication connection between a first mobile phone 10, or cellular phone, used by talker A and a second mobile phone 20, or cellular phone, used by talker B. A radio signal 11 is transmitted from mobile phone 10 to a receiving antenna tower 12. From there the radio signal 11 is coupled to a Base Station Subsystem (BSS) 13, which contains a Base Transceiver Station (BTS) 30 and a Base Station Controller (BSC) 31, shown in FIG. 1B. The BTS 30 contains a radio transceiver, which communicates by radio signals with a mobile phone 10 and couples the communication with the mobile phone 10 to the Base System Controller (BSC) 31. Multiple BTS transceivers are controlled by the BSC 31, which provide allocation and release of radio channels and the handoff between cells as talker A using the first mobile phone 10 moves between cells.

Figure 1B:
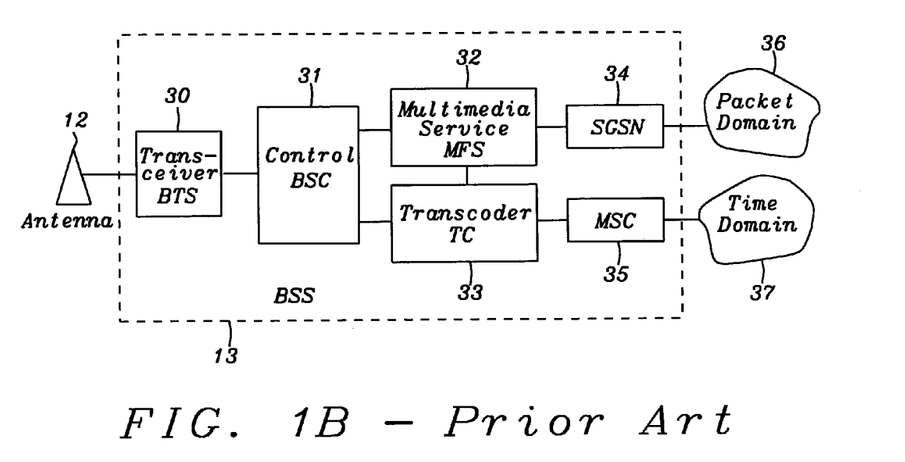

Continuing to refer to FIG. 1B, the BSC 13 communicates with a Multimedia Function Service (MFS) 32, which couples packets of digital data to and from a Serving GPRS Support Node (SGSN) 34 that allows digital data to be sent between mobile phones 10 and 20. The BSC 13 also communicates with Transcoder (TC) 33.

Contained within the TC 33 is a Voice Coder known herein as a vocoder. The vocoder translates the voice signal from the mobile phone 10 and 20 into a time domain 37 signal that can be sent through In Path Equipment (IPE) 14 and the Network 15 coupling the communications between talker B using mobile phone 10 and talker B using mobile phone 20. The vocoder combines packetized groups of speech from the transmitting mobile phone 10 and 20 to be coupled in the time domain 37 through the IPE 14 and the Network 15 to a second vocoder, which then packetizes the speech sent by the transmitting mobile phone into packets that are sent to the receiving mobile phone 10 and 20.

Figure 2A:
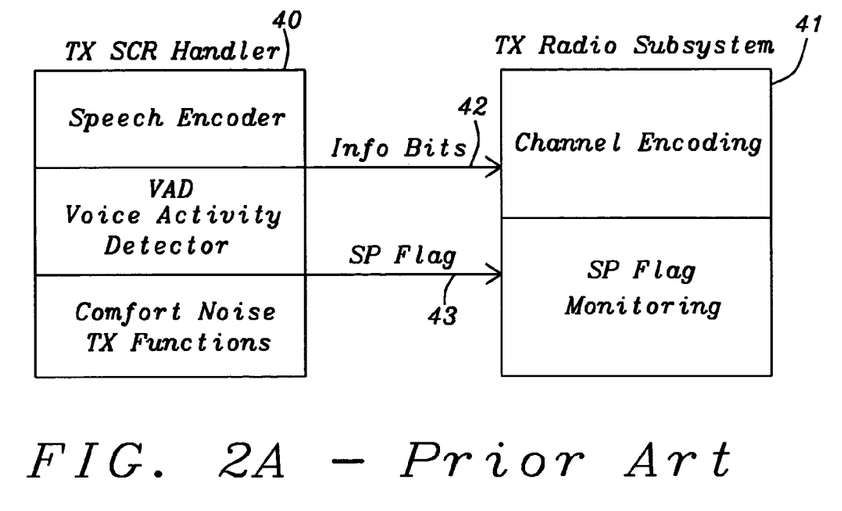
FIG. 2A is a block diagram of prior art for the discontinuous transmission handler for a sending mobile phone.

In FIG. 2A is shown a block diagram of the transmission (TX) function of the Discontinuous Transmission (DTX) function of the prior art for a mobile phone 10 and 20 sending a voice signal from a mobile phone 10 and 20. The circuits that support the DTX are located in the mobile phones 10 and 20 and the vocoder located within the Transcoder (TC) 33. The transmitting TX SCR Handler (Transmission Source Controlled Rate Handler) 40, which includes a Speech Encoder, a Voice Activated Detector (VAD) and a Comfort Noise TX Function, couples information bits (Info Bits) 42 of a 20 ms speech frame and an SP flag 43 to a transmitting TX Radio Subsystem 41. The TX Radio Subsystem 41 includes a Channel Encoding function and an Sp Flag Monitoring function. The SP Flag indicates a speech frame is being transmitted if the flag has a logical "1" value, or a SID (Silence Indicator) frame if the flag value is a logical "0". The TX SCR Handler 40 and the Radio Subsystem 41 forms a part of the mobile phone 10 and 20, and the BSS 13.

Continuing to refer to FIG. 2A, in the TX SCR Handler the speech encoder digitally codes the analog voice signal into a digital form to be sent to the receiving mobile phone. The VAD detects when there is voice from the user of the sending mobile phone so that the transmitting voice signal can be captured and communicated to a receiving phone. The comfort noise transmission function provides a signal so that a receiving user knows that mobile phone call is still connected even though there is a pause in conversation. The channel encoding function packetizes the digitized voice and places each voice packet into available communication slots to be sent to the receiving mobile phone 10 and 20.

The Voice Activity Detector operates continuously and determines whether an input signal from a sending phone contains speech. The VAD controls the overall operation of the transmission of a phone signal indirectly by means of the SP Flag. When speech is detected, the speech encoder output frame is coupled by means of the Info Bits 42 to the TX radio Subsystem 41 and marked with a SP Flag=1. When a particular burst of speech ends, the VAD switches to an inactive speech state. After speech ends and number of consecutive frames (N+1) are transmitted, a new updated SID frame is available for insertion into the transmission of the signal from the sending phone. The first N speech encoder output frames after a speech burst is passed to the TX Radio Subsystem 41 with SP Flag=1, called a "hangover period". After the "hangover period" at the end of a speech burst, a SID frame is computed and coupled to the TX Radio Subsystem 41. The TX SCR Handler 40 then continues to compute SID frames as long, as the VAD is inactive, that are coupled to the TX Radio Subsystem 41, marked with SP Flag=0 indicating that there is no voice signal from the sending phone.

Figure 2B:
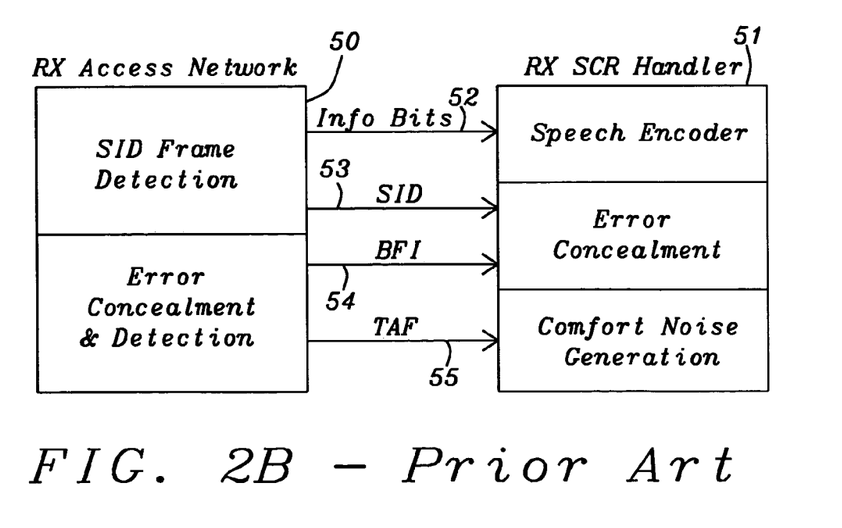
FIG. 2B is a block diagram of prior art for the discontinuous transmission handler for a receiving mobile phone.

In FIG. 2B is shown a block diagram of the receiving transmission function (RX) of the Discontinuous Transmission (DTX) function of the prior art for a mobile phone 10 and 20 receiving a voice signal from a sending mobile phone 10 and 20. This portion of the DTX 50 and 51 forms a part of the mobile phone 10 and 20, and the BSS 13. The RX Access Network 50 for receiving transmission contains a SID frame detection and an error concealment and detection. The RX Handler 51 contains a speech decoder, error concealment and comfort noise generation. The speech decoder translates the digitally transmitted speech into an analog signal to be coupled to the user of the receiving phone, and errors caused by disturbances in the environment that are not recovered are marked and handled separately by the vocoder (voice coder).

Information bits (Info Bits) 52, SID 53, BFI (Bad Frame Indication) 54 and TAF (Time Alignment Flag) 55 signals are coupled to the RX SCR Handler (Receiving Transmission Source Controlled Rate Handler) 51 from the RX Access Network 50.

In the prior art sending a picture by means of the mobile phone system required a separate phone call from a phone call in which there was speech communications between two mobile phones. A method of providing a capability to transmit pictures taken with a cellular phone simultaneous with voice communications to a receiving location without the use of separate cellular phone calls and separate charges is needed in support of the integration of the cellular phone and digital camera functions.

SUMMARY OF THE INVENTION

It is an objective of the present invention to fill unused frames with data to transmit voice and data interleaved during the same cellular phone call.

It is another objective of the present invention to transmit picture data concurrent with voice during the same cellular phone call.

It is still another objective of the present invention to use the Discontinuous Transmission (DTX) feature of a mobile phone system and fill unused Silence Indication (SID) frames with picture data taken with the integrated cellular phone and digital camera.

It is yet another objective of the present invention to transmit data and voice from a cellular phone to a same remote phone location during the same phone call.

It is still yet another objective of the present invention to interleave picture data and voice data and transmit both during a same phone call.

It is also still another objective of the present invention to interleave data and voice and transmit both during the same phone call.

In all modern mobile phones there is a Discontinuous Transmission (DTX). The DTX is used to reduce bandwidth and power consumption of a mobile (cellular) phone while reducing the transfer rate during inactive speech times. The DTX feature is available for voice coders (vocoder) in various forms, including: AMR (adaptive multi-rate), HR (half rate), EFR (enhanced full rate) and FR (full rate). During the inactive speech time only SID (silence indicator) frames are transferred between talker A and talker B. For an AMR vocoder, for example, only each eighth 20 ms frame is used to update background noise attributes. All other frames are not used. The ratio of SID frames to unused frames varies with each vocoder. Filling these unused frames with data allows the transfer of data between talker A and talker B along with voice within the same phone call.

In a communication between talker A and talker B using a GSM (global system for mobile communications) with an active DTX (discontinuous transmission) feature, talker A and B use approximately fifty percent (50%) or half the communication time. The maximum possible communication rate between the two talkers is 64kbits/second of which approximately half of the bandwidth. or 32kbits/second, are not usually used.

During half of the time one talker is (80%) active and twenty percent (20%) passive. If it is assumed that non speech data transfers from A to B can take sixty percent (60%) of the overall transmission time, where only fifty percent (50%) of the non-speech time can be effectively used for transferring data due to overhead and SID, then the data rate (DR) for transferring a picture is DR=16 kbits/s×0.6×0.5=4800 bits/s=600 byte/s, where 0.6=0.5 (receiving talker active)+ 0.2×0.5 (sending talker activity). Thus a data file with a size of 20 kbytes will need approximately 34 seconds transfer time.

In order to implement the transfer of data (a picture) along with voice during the same phone call, changes are required to be made to the DTX handling of messages in the Transcoder (TC) located in the Base Station System (BSS). Depending upon the actual phone system that is used, the feature to allow a picture to be transmitted between talkers can be established when the call is initiated or during the call by selecting a key on the sending mobile phone. The system can be structured such that the transmission of a picture is autonomous where the receiving mobile phone does not have any control, or where the receiving mobile phone confirms the reception of the picture and has a possible right of refusal of the transmission of the data. The transcoder (TC) filters the non-voice data (NVD) and forwards the NVD to the Multimedia Service (MFS) or to the Serving General Packet Radio System Support Node (SGSN). The SGSN sends the non-voice data by means of the packet domain to the SGSN of the receiving talker, which transfers the data to the TC of the receiving talker for insertion into the pauses in the downlink voice stream of the receiving talker.

In a Tandem Free Operation (TFO) only small changes in the TC are required to be able to transfer non-voice data during the time that there is no voice signal. The tandem free operation (TFO) is a solution for eliminating multiple transcoding TC of a call and for improving end-to-end voice quality in mobile-to-mobile phone calls. In a non-TFO connection the TC is required to filter the non-voice data streams and forward the filtered information to the Multimedia Function Service (MFS), or to the Serving GPRS Support Node (SGSN), where GPRS is the general packet support node which transfers packet information between mobile phones. In a non-TFO connection the SGSN sends data by means of a packet domain to the SGSN of the receiving mobile phone, which transfers the data the TC of the receiving mobile phone. The TC inserts the data (picture) into the speech pauses of the downlink voice stream to the receiving mobile phone.

The DTX (discontinuous transmission) handler of the vocoders (voice coders) is located between the mobile phones and the TC (transcoder) located in the BSS (base station subsystem) depending upon the architecture of the system. Since speech is real time, speech has priority in the system over the transmission of data. The control over when data is transmitted is by the absence of speech at the sending end of the mobile-to-mobile communications. When a talker that has data to send becomes inactive (no speech) a VAD (voice activity detector) changes state from active to inactive, which signals a TX (transmission) information and a SP (speech) flag handler to insert data packets into the quiet transmission time slots while respecting the need for SID frame transmission.

The vocoders in a GSM (global system for mobile communications) are based on frames of PCM (pulse coded modulation) lasting for 20 ms where there is "160" samples at an 8 kHz sampling rate. Every 20 ms a decision is made whether a frame is speech active or speech inactive. If a talker with data to send becomes speech inactive, the vocoder switches from active to inactive, allowing data to be sent in subsequent SID frames.

The transmission of non-voice data during non-speech time will become interrupted by required SID frames, re-transmission of previously transmitted corrupted data frames and active talker situations. If a frame is detected to be corrupt by the receiving mobile phone, a request is made for a re-transmission of the corrupted frame. The handling of the re-transmission is done through the interaction the RX (receive transmission) data receiver and the TX (transmission) data packetizer of the transmitting mobile phone. After a correct reception of the transmitted data, the data is further processed by decoding the data image (picture) and/or by storing the data on a flash card, RAM disk or equivalent.

BRIEF DESCRIPTION OF THE DRAWINGS

This invention will be described with reference to the accompanying drawings, wherein.

DETAILED DESCRIPTION OF THE PREFERRED EMBODIMENT

Figure 3A:
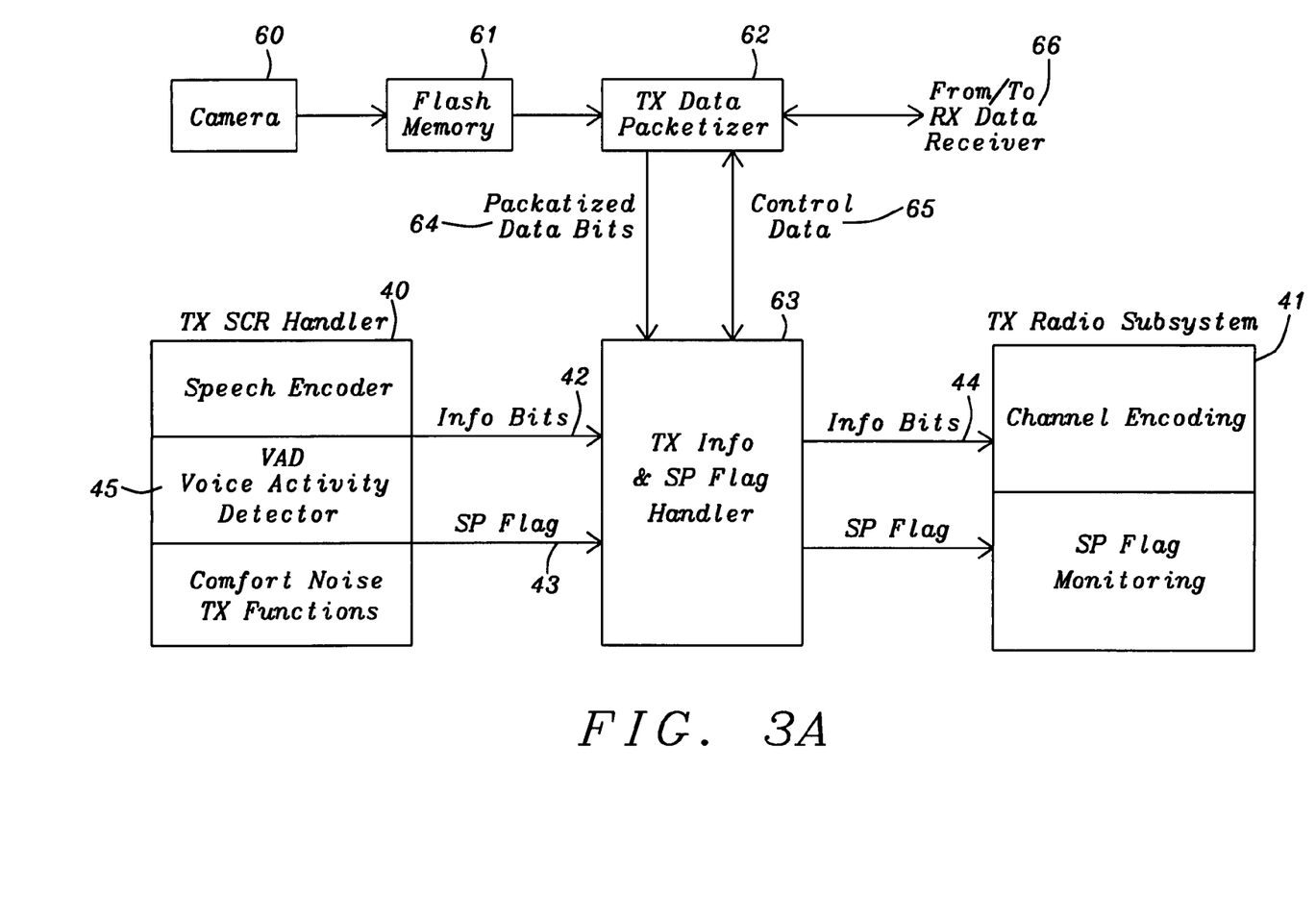
FIG. 3A is a block diagram of the present invention for the discontinuous transmission handler for a sending mobile phone.

In FIG. 3A is shown a block diagram of the present invention for transmitting a digital picture or other digital data concurrent with voice of the sending user of a mobile or cellular phone. In the case of a camera 60 that is integrated with a cellular phone, the picture is taken with the camera 60 by a user of the phone and stored into flash memory 61. The user of the cellular phone initiates the transmission of the picture while talking on the phone of a user of a second phone by selecting the feature on the sending mobile phone to transmit data (picture) during a phone call.

Upon initiating the transmission of the picture, the picture from flash memory 61 is coupled to a transmission data packetizer 62. The transmission and flag handler "TX Info & SP Flag Handler" 63, which is interposed between the TX SCR Handler 40 and the TX Radio Subsystem 41, selects data packets of the picture from the Packetized Data Bits 64 to fill unused time slots in the transmission of voice from the user of the cellular phone that contains the picture to be transmitted. Control Data 65 between the TX Data Packetizer 62 and the "TX Info & Sp Flag Handler" 63 provides status, selection and update information. The SP Flag 43 is used to encode the radio channel of the TX Radio Subsystem 41 and indicates whether a talker is active, or not, or already talking while taking into account any "hangover" time. The Info Bits 42 coming from the TX SCR Handler 40 contain only speech data, whereas the Info Bits 44 coupled from the TX Info &SP Flag Handler 63 contains either speech data or non-voice data. When the TX Info & SP Flag Handler 63 detects an SP Flag=0 (no speech), a request for NVD (non voice data) packet of around approximately 260 bits is made to the TX Data Packetizer 62 through the Control Data connection 65. The packetized data bits 64 are coupled to the TX Info & SP Flag Handler 63, which inserts the packetized data bits 62 into the Info Bits 44 that are coupled to the TX Radio Subsystem 41. The From/To RX Data Receiver 66 provides a control channel that allows control communication between the TX Data Packetizer 62 and the RX Data Receiver 70.

Continuing to refer to FIG. 3A, The "TX Info & SP Flag Handler" 63 selects the data packets through the Packetized Data Bits 64 and fills quiet voice frames, which are unused by the sending phone user, with data packets. The data packets are coupled from the TX Data Packetizer 62 through the TX Info & SP Flag Handler 63 to the TX Radio Subsystem 41 under the Control Data 65. The TX Info &SP Flag Handler coordinates the transmission of NVD and voice data through the TX Radio Subsystem 41. The quiet voice frames amongst the voice frames used for voice data are filled with picture data exclusive of a SID frame that is necessary to provide a recognition of the phone call being active. Continuing to refer to FIG. 3A, during the time that there is transmission of voice and data to a receiving mobile, or cellular, phone speech will have priority over picture data or any other non-speech data that is being transmitted since speech is temporal and has to be transmitted in real time whereas pictures and other data are not time dependent. The control of whether speech or data will be transmitted is controlled by the speech behavior of the sender. When the sender becomes inactive, taking a breath or just pausing, the VAD (Voice Activity Detector) 45 changes state from active to inactive signaling the "TX Info & SP Flag Handler" 63 that data packets can be inserted into the signal being transmitted to the receiving mobile, or cellular, phone while respecting the necessary SID frame transmission.

Figure 3B:
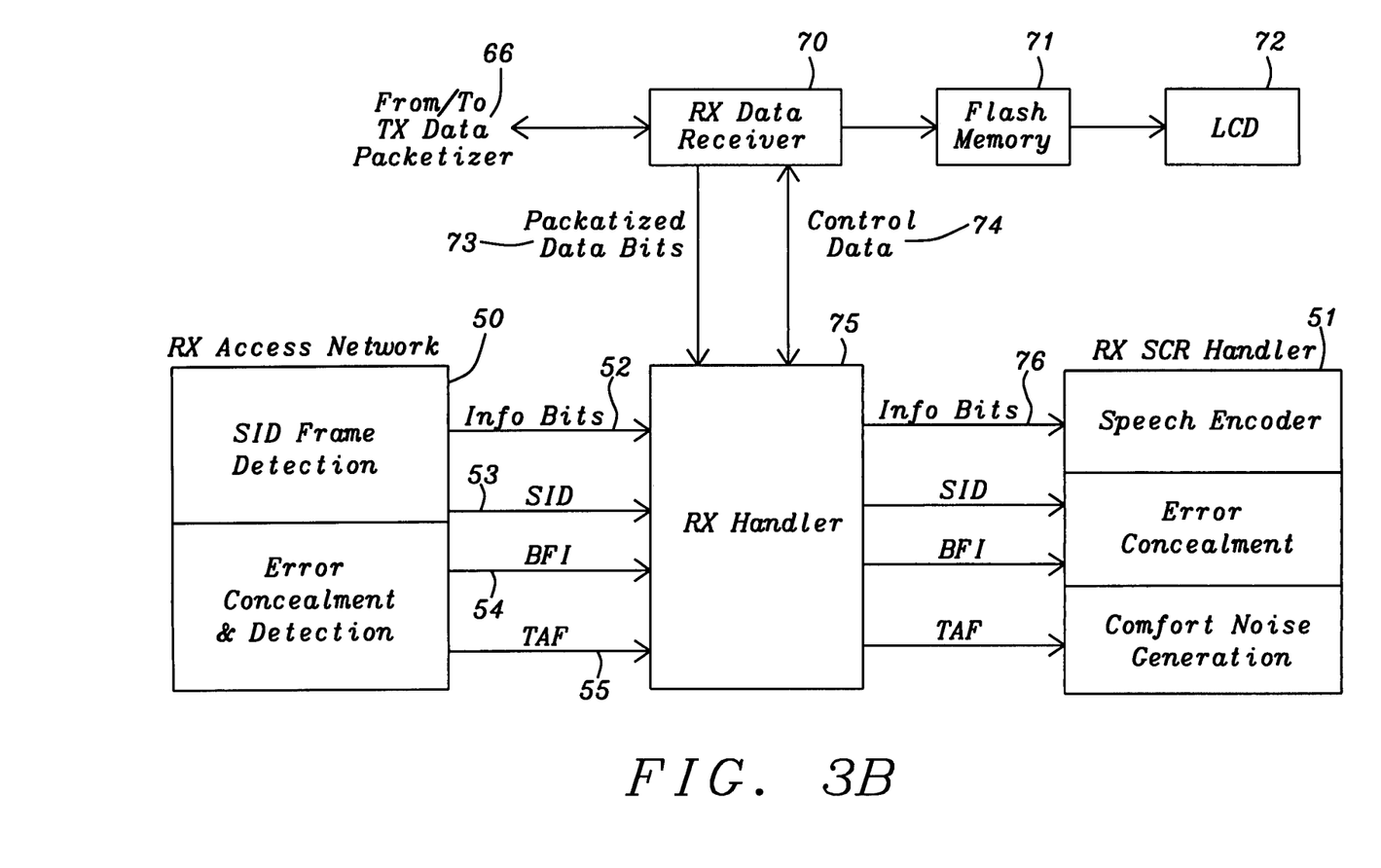
FIG. 3b is a block diagram of the present invention for the discontinuous transmission handler for a receiving mobile phone, FIG. 4A and B are signal diagrams of prior art of the digital signals between connected mobile phones.

In FIG. 3B is shown a block diagram of the present invention for the receiving of a digital picture or other digital data concurrent with voice of the sending user of a mobile or cellular phone. Dedicated bits within the Info Bits 52 are used to identify an NVD (non-voice data) packet. The RX Data Receiver 70 communicates with the TX Data Packetizer 66 with control information that allows NVD packets to be sent from the TX Radio Subsystem 41 to the RX Access Network 50. The Data Receiver 70 couples Packetized Data Bits 73 from the RX handler 75 to the Flash Memory 71, which is then displayed on the LCD screen 72. The RX Access Network 50 couples Info Bits 52 containing voice and non-voice data to the RX Handler 75 along with SID frame information 53, BFI (Bad Frame Indication) 54 and the TAF (Time Alignment Flag) 55. The RX handler removes the NVD (non-voice data) 52 and couples the NVD to RX Data Receiver 70 by way of the Packetized Data Bits 73 using Control Data 74 to maintaining synchronization of operations between the RX Data Receiver 70 and the RX Handler 75. The RX Handler 75 couples the voice data to the RX SCR Handler 51 by means of the Info Bits 76 to the Speech Decoder within the RX SCR Handler 51. Since disturbances in the radio environment can cause errors, corrupted NVD frames are marked, and a request for retransmission is made by the RX Data Receiver 70. Corrupted voice data that cannot be recovered is handled separately by the vocoder by means of the error concealment. The RX SCR Handler 51 generates a Comfort Noise that is used to keep the user of the receiving mobile phone aware that the phone connection is still active.

Continuing to refer to FIG. 3B, if the NVD data that is being received is corrupt, a request is sent back to the TX Data Packetizer 66 and 62 for retransmission of the corrupted data. The "TX Info & Flag Handler" 63 allocates unused SID frames to the retransmission of the corrupted data and delays the transmission of picture data that has not yet been transferred. The use of unused SID frames for retransmission also respects the need for a SID frame to continue to indicate that the sending and receiving phones are still connected.

Figure 4A:
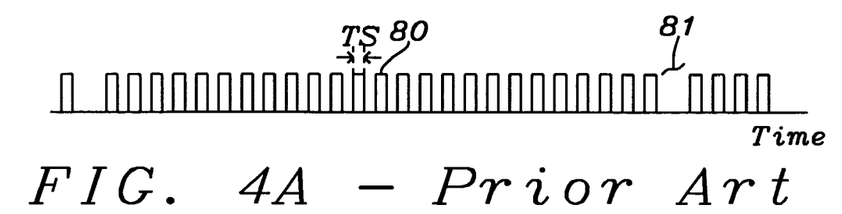
Figure 4B:
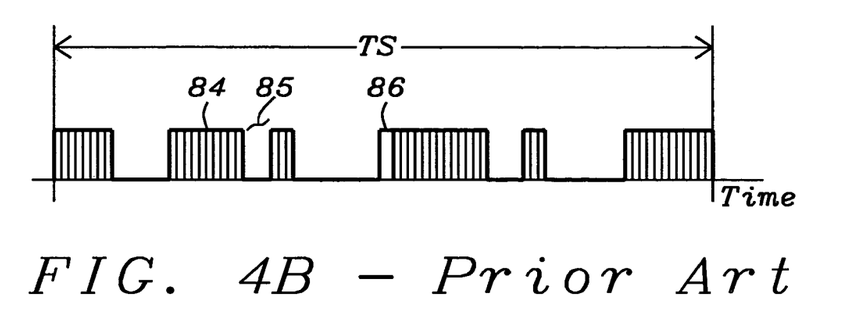

In FIG. 4A is shown a signal diagram of prior art in which time slots TS 80 are used to transmit voice conversation and data between two mobile or cellular phones using a GSM (Global Systems for Mobile communications). The GSM uses a combination of FDMA (Frequency Division Multiple Access) and TDMA (Time Division Multiple Access). This allows numerous available carrier frequencies at a 200 KHz spacing (a FDMA bit) and each carrier is broken into time slots that support 8 separate conversations (a TDMA bit). This leads to the Mobile phone, or the cellular phone being pulsed with a 1:8 duty cycle. Voice and data transmission are encoded into the time slots 80 using phase modulation with every $26^{th}$ pulse 81 being omitted for coding and control reasons. In FIG. 4B is shown a signal diagram of prior art of a single time slot TS 80. Speech 84 is distributed over the time slot 80 with intervening regions of silence 85. The silence is a result of one taking a breath or normal conversation breaks. A required SID frame 86 is shown to indicate that the phone conversation is still taking place even though no speech on the sending end is occurring.

Figure 4C:
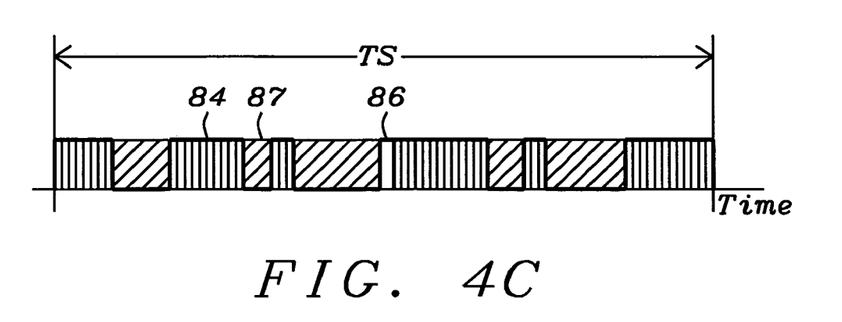
FIG. 4C is a signal diagram of the present invention for the digital signals between connected mobile phones.

In FIG. 4C is shown a signal diagram of the present invention in which speech 84, the required SID frame 86 and data frames 87 containing picture data or other digital data are transmitted within a same time slot. This allows the data 87 to be transmitted from a sending mobile, or cellular phone, concurrently to a receiving mobile or cellular phone. The data frames 87 are also used for retransmission of data that had previously been detected at the receiving phone to be contaminated. Thus the present invention allows the receiving phone to receive pictures, or other digital data, while a phone conversation is being carried out between the talker on the sending phone and the talker on the receiving phone without the need to make a separate phone calls, one for speech and one for data. The data frames shown herein could be transmitted to other receiving equipment that is configured to adapt to the requirements of the sending phone system.

While the invention has been particularly shown and described with reference to preferred embodiments thereof, it will be understood by those skilled in the art that various changes in form and details may be made without departing from the spirit and scope of the invention.

What is claimed is:

1. A mobile phone system, comprising:
   a) a first mobile phone containing non-voice data comprising images taken by a camera integrated into said first mobile phone and digital data,
   b) a data packetizer to form said non-voice data for transmission to a second mobile phone,
   c) said first mobile phone coupled to said second mobile phone by radio signals to a mobile phone system,
   d) said non-voice data (NVD) sent to said second mobile phone concurrent with speech by user of said first mobile phone, wherein said NVD formed into data packets by said data packetizer whereupon said data packets intermingled with voice data under control of a transmission and flag handler of said first mobile phone, and wherein the transmission and flag handler requests said data packets from said data packetizer when said flag indicates an absence of voice data,
   e) said second mobile phone receives the NVD intermingled with speech from the first mobile phone, wherein information bits connected to a receiving transmission handler identify NVD being sent to the second mobile phone and wherein a transmission data receiver communicates with said packetizer to allow NVD packets to be sent from a transmission radio subsystem, whereby a receiving transmission handler separates the NVD from the transmission from the first mobile phone to allow the transmission data receiver to couple the NVD data to a flash memory and then an LCD viewing screen on the second mobile phone.

2. The system of claim 1, wherein said non-voice data is sent to said second mobile phone within unused signal frames located between speech signal frames.

3. The system of claim 2, wherein said non-voice data stored in a flash memory on said first mobile phone is formed into packets of data and said packets are transmitted to said second mobile phone within said unused signal frames.

4. The system of claim 1, wherein said non-voice data is digital data.

5. The system of claim 1, wherein said non-voice data is digital picture data.

6. The system of claim 1, wherein said non-voice data is digital picture data taken with a digital camera integrated together with said first mobile phone.

7. The system of claim 1, wherein said non-voice data received by said second phone is requested to be retransmitted if said second phone determines said data to be corrupted.

8. The system of claim 1, wherein said non-voice data transmitted to said second mobile phone, which is determined not to be corrupted, is stored in a memory in said second mobile phone.

9. The system of claim 8, wherein said memory is a non-volatile memory.

10. The system of claim 1, wherein said first and second mobile phones are cellular phones.

11. The system of claim 1, wherein said non-voice data is any digital data available on said first mobile phone.

12. The system of claim 1, wherein said non-voice data is any data that can be formed into packets of data that can be transmitted to said second mobile phone in unused signal frames located between speech signal frames.

13. The system of claim 1, wherein said non-voice data sent to said second mobile phone is displayed on an LCD display contained within said second mobile phone.

14. The system of claim 1, wherein said second mobile phone can be any electronic device that can receive mobile phone signals and store said data.

15. The system of claim 1 wherein said first mobile phone can be any electronic system that can transmit mobile phone signals to said mobile phone system.

16. A method of transmitting non-voice data during a phone conversation between two mobile phone users, comprising:
   a) forming said non-voice data (NVD) on a first mobile phone of a mobile phone system,
   b) creating packets of said non-voice data,
   c) communicating between a data packetizer in said first mobile phone and a data receiver in a second mobile phone to allow data packets to be transmitted from a radio transmission system,
   d) inserting said packets into voids in a transmission of voice data of said first mobile phone,
   e) separating said non-voice data from said voice data at the second mobile phone using information bits coupled to a receiving handler, whereby the receiving handler separates NVD from voice data in a transmission data receiver,
   e) storing said non-voice data in a memory contained within said second mobile phone and coupling the NVD to an LCD viewing screen of the second mobile phone.

17. The method of claim 16, wherein forming said non-voice data is by taking a picture with a digital camera integrated with said first mobile phone.

18. The method of claim 16, wherein forming said non-voice data is with any digital data that is contained on said first mobile phone.

19. The method of claim 16, wherein creating packets of non-voice data and inserting said packets into said voids is controlled by a transmission handler of a discontinuous transmission system located within the mobile phone system.

20. The method of claim 16, wherein separating said non-voice data form said voice data at a second mobile phone is controlled by a reception handler of a discontinuous transmission system located within the mobile phone system.

21. The method of claim 16, wherein storing said non-voice data is into a non-volatile memory.

22. The method of claim 16, wherein said first and second mobile phones are cellular phones.

23. The method of claim 16, wherein said second mobile phone is any electronic system that can receive signals from said mobile phone system.

24. The method of claim 16, wherein said first mobile phone can be an electronic system that can transmit mobile phone signals to said mobile phone system.

25. A system containing a digital camera integrated with a mobile phone, comprising:
  a) a means for talking between mobile phones in a mobile phone system,
  b) a means for taking a picture with a digital camera integrated into said mobile phones,
  c) a means for transmitting digital data of said picture within the transmission voids of a voice transmission between said mobile phones, wherein the transmitting of digital data controlled by a transmission and flag handler, whereby the transmission and flag handler requests data packets comprising digital data of said picture when said flag indicates an absence of voice data,
  d) a means for extracting said digital data from said voice transmission, wherein an information bit coupled a data handler of a receiving mobile phone identifies the digital data of the picture and wherein a data receiver communicates with a data packetizer of a sending phone to allow the digital data sent by a radio subsystem, whereby the data handler separates the digital data from voice data, whereupon the digital data stored in a memory and further coupled to an LCD screen for viewing.

26. The system of claim 25, wherein said means for transmitting said digital data within the transmission voids of said voice transmission is controlled by a transmission handler of a discontinuous transmission system located within said mobile phone system.

27. The system of claim 25, wherein the means for extracting said digital data from said voice transmission is controlled by a reception handler of a discontinuous transmission system located within said mobile phone system.

28. The system of claim 25, wherein the means for transmitting said digital data of said picture within the transmission voids of the voice transmission allows a concurrent transmission of voice and picture within a same phone call.

29. The system of claim 25, wherein said digital data is any digital data contained within a transmitting mobile phone that can be interpreted by a receiving mobile phone.

30. The system of claim 25, wherein said means for transmitting digital data of said picture within the transmission voids of said voice transmission is between a mobile phone and any electronic system that can interface with said mobile phone system.

31. The system of claim 25, wherein said mobile phones are cellular phones.

32. The system of claim 25, wherein the means for transmitting digital data includes capability for retransmission of corrupted data.

33. The system of claim 25, wherein the means for transmitting digital data within the transmission voids of the voice transmission allows for a required silence indication frame.

34. The system of claim 25, wherein the means for transmitting digital data within the transmission voids of the voice transmission uses a voice activity detector to detect when there is no voice signal.

* * * * *